(12) United States Patent
Baiyor et al.

(10) Patent No.: US 6,282,429 B1
(45) Date of Patent: Aug. 28, 2001

(54) SYSTEM FOR PROVIDING PRIORITIZED WIRELESS COMMUNICATION SERVICE TO WIRELESS COMMUNICATION SUBSCRIBERS

(75) Inventors: Robert John Baiyor, Naperville, IL (US); Diane Colby Wolchik, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/421,719

(22) Filed: Oct. 20, 1999

(51) Int. Cl.⁷ ...................................................... H04B 7/00
(52) U.S. Cl. ........................ 455/512; 455/414; 455/433; 455/436; 455/453
(58) Field of Search ..................................... 455/512, 414, 455/412, 433, 436, 438, 456, 509, 560, 552, 452, 522, 450, 511, 507, 517, 434, 453; 370/328, 329

(56) References Cited

U.S. PATENT DOCUMENTS

| | | | | |
|---|---|---|---|---|
| 5,745,481 | * | 4/1998 | Phillips et al. | 370/312 |
| 5,765,108 | * | 12/2000 | Martin et al. | 455/426 |
| 5,812,656 | * | 9/1998 | Gardland et al. | 379/208 |
| 6,009,331 | * | 12/1999 | Ueda | 455/450 |
| 6,052,562 | * | 4/2000 | Dorenbosch | 455/38.1 |
| 6,069,882 | * | 5/2000 | Zellner et al. | 370/329 |
| 6,119,014 | * | 9/2000 | Aiperorich et al. | 455/466 |
| 6,167,255 | * | 12/2000 | Kennedy, III et al. | 455/414 |
| 6,167,261 | * | 12/2000 | Amin | 455/426 |
| 6,208,865 | * | 3/2001 | Veerasamy | 455/450 |

* cited by examiner

Primary Examiner—William Trost
Assistant Examiner—Congvan Tran
(74) Attorney, Agent, or Firm—Duft, Graziano & Forest, P.C.

(57) ABSTRACT

The system for providing prioritized wireless communication service to wireless communication subscribers provides the capability to restrict access to wireless communications services to a selected set of subscribers, such that their access to wireless communication services is given preferential treatment. This is accomplished by provisioning the cell sites of a wireless communications system into a plurality of service priority groupings, with wireless subscribers being assigned a one of the plurality of service priorities. The wireless service provider can then differentially provide wireless communication services to the wireless subscribers, based upon the service priority assigned to a particular subscriber. The wireless subscribers who have been assigned a predetermined service priority are provided with access to wireless communication capacity in the wireless communication system via the dialing of a predetermined feature code to ensure their preferential access to wireless communication services.

23 Claims, 2 Drawing Sheets

SYSTEM FOR PROVIDING PRIORITIZED WIRELESS COMMUNICATION SERVICE TO WIRELESS COMMUNICATION SUBSCRIBERS

CROSS REFERENCE TO RELATED APPLICATIONS

This application is related to an application titled "SYSTEM FOR PROVIDING GUARANTEED WIRELESS COMMUNICATION SERVICE TO PRIORITY WIRELESS COMMUNICATION SUBSCRIBERS", filed on Apr. 16, 1999 as U.S. Patent Application Serial Number not yet assigned.

FIELD OF THE INVENTION

This invention relates to wireless communications systems and, in particular, to a system for providing subscribers with priority access to wireless communication services on an authorized subscriber basis, as identified by a priority feature code that is included in the initial call origination dial string received at the cell site from the calling mobile wireless communication device.

PROBLEM

It is a problem in the field of wireless communication systems to appropriately allocate cell site and network resources to serve the increasing demand for wireless communications services. This problem of allocation of resources is exacerbated in emergency situations, where a multitude of wireless communications subscribers all vie for limited available wireless resources. An example of this situation is in the instance of a natural disaster, such as a severe weather conditions, where the land lines are down or otherwise inaccessible or unavailable and the only communication service available to the subscriber is wireless communications. In this instance, wireless subscribers' service requests can cause a temporary overload in the wireless communication system. The emergency service personnel operational in the affected area have to compete for wireless communication service on an equal basis with the other wireless communication subscribers. The emergency service personnel can therefore be blocked from call origination within a cell or their existing wireless calls can be interrupted in a call handoff or as they traverse multiple cells. The interruption of an emergency call or the inability to place an emergency call is an unacceptable service condition, yet a reality in existing wireless communication systems.

To a lesser degree, the same resource overload phenomena occurs in heavy traffic areas at certain times of day, such as in the vicinity of an airport at rush hour when a large number of flights are concurrently arriving and/or departing. Furthermore, the call origination by emergency service personnel is not the only critical service cases that are impacted by these conditions. The origination of a wireless call by a subscriber to an emergency service number represents another critical communication connection that is subject to the above-noted blocking. Thus, existing wireless communication systems treat vital communications with the same priority as non-essential wireless communications, since there is presently no capability in such systems to differentiate among wireless subscribers and/or call destinations.

A further complication is that the very process of screening the identity of the wireless subscriber for each call origination places an additional call processing burden on the wireless system and can itself exacerbate the call overload. It would be advantageous to identify wireless subscribers who have priority calling before the call origination request consumed significant call processing resources.

SOLUTION

The above described problems are solved and a technical advance achieved in the field by the present system for providing prioritized wireless communication service to wireless communication subscribers. This system provides the capability to restrict access to wireless communications services to a selected set of subscribers, such that their access to wireless communication services is given preferential treatment. This is accomplished by provisioning the cell sites of a wireless communications system into a plurality of service priority groupings, with the wireless subscribers also being divided into these service priority groupings, by being assigned one of the plurality of service priorities. The wireless service provider can then differentially provide wireless communication services to the wireless subscribers, based upon the service priority assigned to a particular subscriber.

The present system for providing prioritized wireless communication service to wireless communication subscribers can be manually activated to provide prioritized wireless communication service for subscribers in a selected one or more of the service priorities in response to the occurrence of an emergency. Subscribers whose service priority has been authorized can therefore receive wireless communication services by the dialing of a predefined feature code upon call initiation. Alternatively, the present system for providing prioritized wireless communication service to wireless communication subscribers can automatically engage in response to a traffic overload condition to ensure that emergency service personnel have immediate access to wireless communication services, regardless of the presence of an emergency situation that impacts the traffic load on the wireless communication system and priority wireless subscribers have preferential access to wireless communication services. In either case, the wireless subscribers who have been assigned a predetermined service priority are preferentially queued or provided with access to reserved wireless communication capacity in the wireless communication system via the dialing of a predetermined feature code to ensure their preferential access to wireless communication services.

DETAILED DESCRIPTION

Cellular mobile telecommunication systems represent one example of wireless communications systems and function to provide the service of connecting mobile telecommunications customers, each having a mobile subscriber unit, to both land-based customers who are served by the common carrier public telephone network as well as other mobile telecommunications customers. In such a system, all incoming and outgoing calls are routed through the mobile switching center (MSC), which is connected to a plurality of base stations which communicate with mobile subscriber units located in the area covered by the base stations. The mobile subscriber units are served by the base stations, each of which is located in one cell of a larger service region. Each base station in the service region is connected by a group of communication links to the mobile switching center, with the communication link being either direct or indirect through a controller that may span a plurality of base stations. A communication link transports user data, which may be a digital representation of voice, between the base station and the mobile switching center. Each base station contains a group of radio transmitters and receivers, with each transmitter-receiver pair being connected to one communication link. Each transmitter-receiver pair operates on a pair of radio frequencies: one frequency to transmit radio signals to the mobile subscriber unit and the other frequency to receive radio signals from the mobile subscriber unit.

With CDMA systems, a plurality of transmitter-receiver pairs share a common frequency pair. This is made possible by the orthogonal coding that is inherent with CDMA. The first stage of a cellular communications connection is executed when a transmitter-receiver pair at the base station, operating on a predetermined pair of radio frequencies, is activated and a mobile subscriber unit is tuned to the same pair of radio frequencies. The second stage of the communication connection is executed at the mobile switching office during which the call path is extended to outgoing or incoming trunks to the common carrier public telephone network. At this point in time, the call is considered as being established. The mobile switching center contains a switching network to switch mobile customer's voice and/or data signals from the communication link to an incoming or outgoing trunk. The mobile communication system is controlled by a mobile telecommunication controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the mobile subscriber units to the selected radio frequency.

Each cell in the ground-based cellular mobile telecommunication network comprises a predetermined volume of space radially arranged around the base station transmitting antenna with the region of space roughly approximating a cylindrical volume having a limited height. Since all of the mobile subscriber units are installed in ground-based units (such as motor vehicles) in traditional cellular mobile telecommunication systems, the antenna radiation pattern of the base station is aligned to be proximate to the ground and the polarization of the signals produced by the base station antenna is vertical in nature. In order to prevent the radio signals in one base station from interfering with radio signals in an adjacent base station, the transmitter-receiver frequencies and/or orthogonal coding for adjacent base stations are selected to be different so that there is sufficient signal separation between adjacent transmitter frequencies and orthogonal coding to avoid overlapping transmissions among the adjacent base stations. When a ground-based mobile subscriber unit initiates a call connection, control signals from the local base station transmitter cause the frequency agile transceiver in the ground-based mobile subscriber unit to operate at the frequency of operation and orthogonal coding designated for that particular base station. As the ground-based mobile subscriber unit moves from one base station to another, the call connection is handed off to the successive base stations and the frequency agile transceiver in the ground-based mobile subscriber unit adjusts its frequency of operation and/or orthogonal coding of the transmitter located at the base station in which the ground-based mobile subscriber unit is presently operational. Furthermore, with CDMA, it is possible that a mobile subscriber unit may be simultaneously communicating with a plurality of base stations. Such a configuration is commonly called a soft handoff and is preferable to hand-offs in which a mobile subscriber unit is transferred from one base station to another. The latter type of handoff is commonly called a hard handoff. With a soft handoff, base stations are added or dropped from the plurality of base stations serving the mobile subscriber unit as the mobile subscriber unit traverses the serving area supported by the mobile switching center. However, all of the base stations in the plurality of base stations serving the mobile subscriber unit must communication with the given mobile subscriber unit on the same transmitter-receiver frequencies.

Wireless Communications System Architecture

Figure 1:
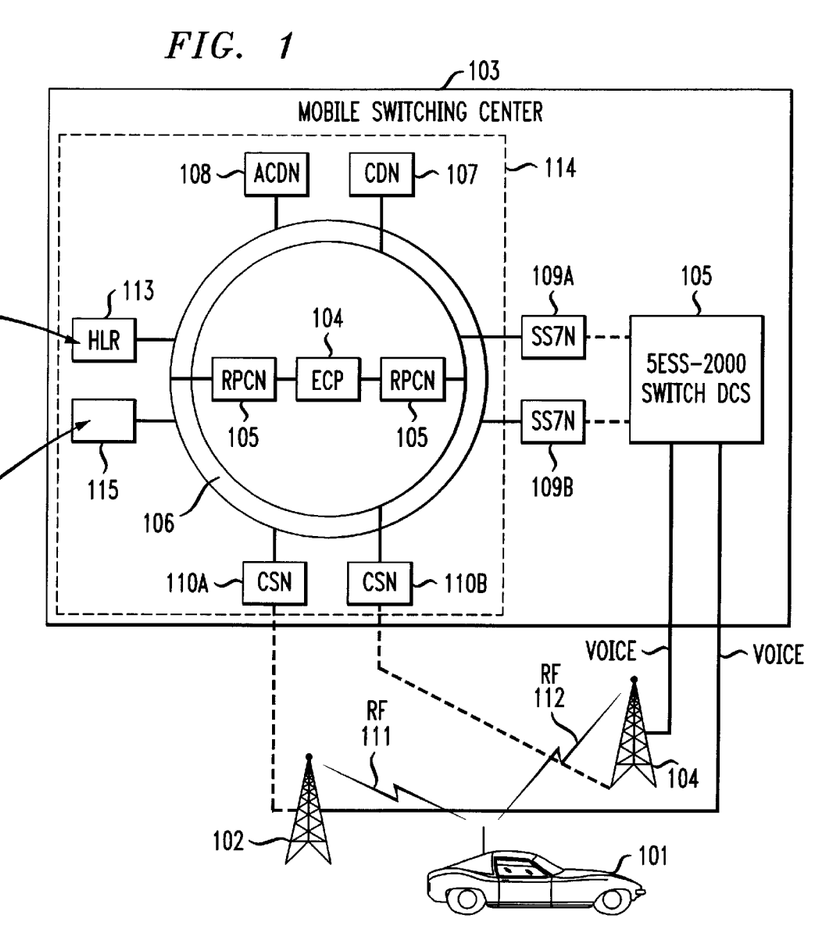
FIG. 1 is the block diagram of the architecture of the present system for providing prioritized wireless communication service to wireless communication subscribers and one example of an existing commercial wireless communications system in which it is implemented.
Figure 2:
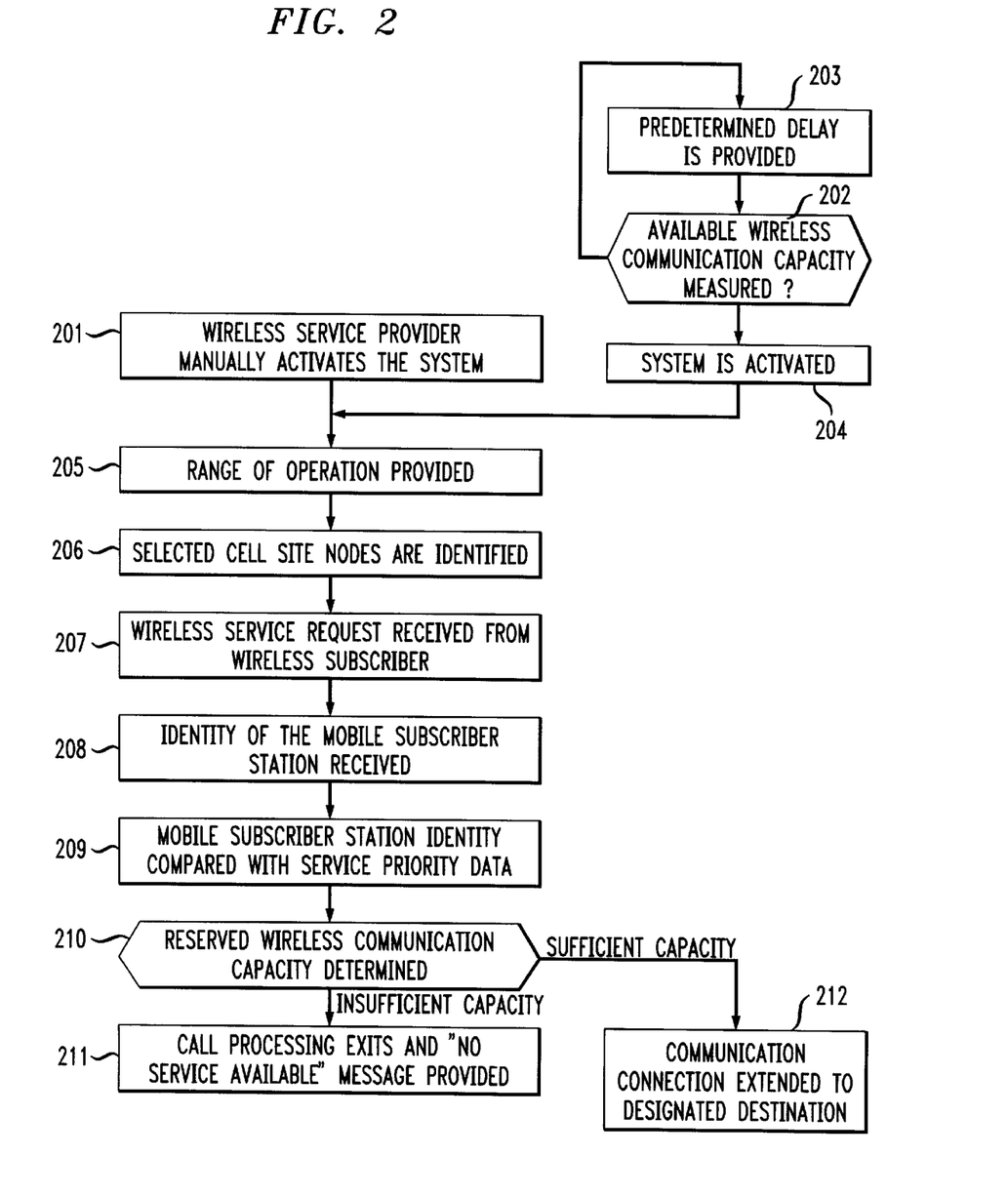
FIG. 2 illustrates in flow diagram form the operation of the present system for providing prioritized wireless communication service to wireless communication subscribers.

FIG. 1 is the block diagram of the architecture of the present system for providing prioritized wireless communication service to wireless communication subscribers 100 and one example of an existing commercial wireless communications system in which it is implemented, and FIG. 2 illustrates in flow diagram form the operation of the present system for providing prioritized wireless communication service to priority wireless communication subscribers. In the description of the disclosed invention, the major entities are the mobile subscriber station 101, base stations 102 and 104, and the mobile switching center 103 which is described as a CDMA system although their feature can be implemented in a TDMA system. The mobile switching center 103 contains a mobile telecommunication controller 114 which includes an executive control processor (ECP) 104 connected to a ring peripheral controller node (RPCN) 105, both of which are linked to a ring structure 106. The ring structure 106 provides a transport means for communicating among the entities within the mobile switching center 103. Also contained within the mobile telecommunication controller 114 are call processing/database node (CDN) 107 and an administrative call processing node (ACDN) 108. A major function of these entitles is the execution of call processing associated with the mobile switching center 103. The 5ESS-2000 Switch DCS 105 provides the telephone connectivity between base stations 102 and 104. The 5ESS-2000 Switch DCS is connected to the IMS/CNI Ring 106 through SS7 nodes (SS7N) 109A, 109B. Base stations 102 and 104 are connected to the IMS/CNI Ring 106 through cell site nodes (CSN) 110A, 110B. The mobile switching center 103 has additional functionality such as billing, administration, and maintenance, requiring additional entities. However, the corresponding description of these entities are not essential to the embodiment of the disclosed invention. Base stations 102 and 104 communicate with mobile subscriber station 101 using RF channels 111 and 112, respectively. RF channels 111 and 112 convey both command messages as well as digital data, which may represent voice signals being articulated at the mobile subscriber station 101 and the far-end party. With a CDMA system, the mobile subscriber station communicates with at least one base station 102. In FIG. 1, the mobile subscriber station 101 is simultaneously communicating with two base stations 102, 104, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base stations may operate as the primary base station with respect to the other serving base stations. The base stations communicate with other base stations through the cell site nodes 110A, 110B. Of course, a mobile subscriber station 101 may communicate with only a single base station if determined as sufficient by the wireless communications system.

Activation of the System for Providing Prioritized Wireless Communication Service The present system for providing prioritized wireless communication service to wireless communication subscribers 100 provides the capability to restrict access to wireless communications services to a selected set of subscribers, such that their access to wireless communication services is not interruptible or is provided on a preferential basis. This is accomplished by provisioning the cell site nodes 110A, 110B of a wireless communications system into a plurality of service priority groupings, with wireless subscribers being assigned one of the plurality of service priorities, by the provision of service priority defining data in the Home Location Register 113 for the wireless subscribers, which service priority data indicates the level of priority that the wireless subscriber is provided. The wireless service provider can then differentially provide wireless communication services to the wireless subscribers, based upon the service priority assigned to a particular subscriber.

Figure 3:
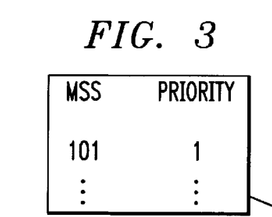
FIGS. 3 and 4 illustrate, respectively, a typical data structure used to define the plurality of service priorities and their assignment to wireless subscribers, and the optional wireless call capacity allocated for each service priority on a per cell basis.
Figure 4:
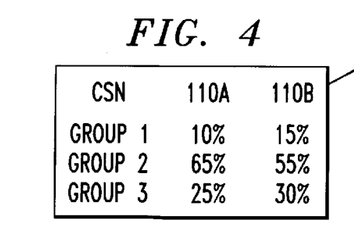

The system for providing prioritized wireless communication service to wireless communication subscribers 100 can either deny service to all wireless subscribers who are not members of the selected one or more of the service priorities, or can either preferentially queue or allocate the wireless communication capacity to the plurality of sets of service priorities on a predetermined threshold basis by allocating either communication channels or queue slots in the call origination/service queue. FIGS. 3 and 4 illustrate, respectively, a typical data structure used to define the plurality of service priorities and their assignment to wireless subscribers, and the optional wireless call capacity allocated for each service priority on a per cell basis. For example X% of the wireless communication capacity can be allocated for use by the members of service priority group 1, while Y% of the wireless communication capacity can be allocated for use by the members of service priority group 2, and the like, which data is stored in memory 115. These defined percentages can vary from cell site node 110A to cell site node 110B. Therefore, the system for providing prioritized wireless communication service to wireless communication subscribers 100 always maintains a predetermined wireless communication capacity for emergency service personnel (as an example). Furthermore, in an emergency situation, the assigned percentages can be modified to thereby provide additional capacity for emergency service personnel, at the expense of diminishing the wireless communication capacity available to other wireless subscribers. The architecture and administration of the algorithm used to allocate wireless communication capacity is a matter of local needs and can be implemented in any number of ways. For the purpose of this description, the allocation of wireless communication capacity is assumed (for simplicity of description) to be manually activated and comprises fixed allocations between two service priority groups: emergency service personnel and other wireless subscribers.

In operation, at step 201, the wireless service provider manually activates the system for providing prioritized wireless communication service to wireless communication subscribers 100 in a selected one or more of the service priorities in response to the occurrence of an emergency. This entails an employee of the wireless service provider, typically located at the mobile switching center 103, inputting control information via an administrative work station (not shown) to activate the system for providing prioritized wireless communication service to wireless communication subscribers 100. Alternatively, at steps 202–204 the present system for providing prioritized wireless communication service to wireless communication subscribers 100 can automatically engage in response to a traffic overload condition to ensure that emergency service personnel have immediate access to wireless communication services, regardless of the presence of an emergency situation that impacts the traffic load on the wireless communication system and priority wireless subscribers are provided with preferential access to wireless communication services. In this case, at step 202 the system for providing prioritized wireless communication service to wireless communication subscribers 100 measures the available wireless communication capacity in the wireless communication system and, if this capacity does not fall below a predetermined threshold, processing exits to step 203 where a predetermined delay is provided before the process reinitiates at step 202. If at step 202 this capacity does fall below the predetermined threshold, processing advances to step 204, where the system for providing prioritized wireless communication service to wireless communication subscribers 100 is activated. In either case, the wireless subscribers who have been assigned a predetermined service priority are provided with access to reserved wireless communication capacity in the wireless communication system via the dialing of a predetermined feature code to ensure their preferential access to wireless communication services.

Activated Range of Operation of the System

The system for providing prioritized wireless communication service to wireless communication subscribers 100 is activated to provide prioritized wireless communication service in a manner that is commensurate with the locale(s) that require such service. Therefore, at step 205, the definition of the range of operation of the activated system for providing prioritized wireless communication service to wireless communication subscribers 100 is either input by the employee of the wireless service provider or automatically determined by the system for providing prioritized wireless communication service to wireless communication subscribers 100. The definition of the range of operation can be in geographic terms (such as county-wide), as provided to the wireless service provider by a responsible civil authority (such as a sherif's department), which geographic terms are translated to an associated set of cell site nodes 110A, 110B that provide wireless communications services in the corresponding geographic area. This translation can be a manual operation, but is preferably a preprogrammed translation that is contained within the system for providing prioritized wireless communication service to wireless communication subscribers 100 to thereby expedite the activation of this system and reduce the possibility of error in activation.

The processing of the operation of the activated system for providing prioritized wireless communication service to wireless communication subscribers 100 advances to step 206 where the selected cell site nodes 110A, 110B are identified in a database, or associated flag bits are set in call processing in the call processing/database node (CDN) 107 of the mobile switching center 103. In addition, the prioritization codes are transmitted to the cell site nodes 110A, 110B to identify the service priorities that are authorized to receive preferential access to wireless communication services.

Operation of the System for Providing Guaranteed Wireless Communication Service The operation of the activated system for providing prioritized wireless communication service to wireless communication subscribers 100 is effected at step 207 in response to a wireless service request from a wireless subscriber, such as mobile subscriber station 101 dialing a predetermined feature code in conjunction with a call origination. In well known fashion, a wireless service request is initiated when a transmitter-receiver pair in a base station 102, operating on a predetermined pair of radio frequencies, is turned on and a mobile subscriber station 101, is tuned to the same pair of radio frequencies. When a ground-based mobile subscriber station 101 initiates a call connection, control signals from the local base station transmitter cause the frequency agile transponder in the ground-based mobile subscriber station 101 to operate at the frequency of operation and orthogonal coding designated for that particular base station 102. As the ground-based mobile subscriber station 101 moves from one base station 102 to another base station 104, the call connection is handed off to the successive base station 104 and the frequency agile transponder in the ground-based mobile subscriber station 101 adjusts its frequency of operation and orthogonal coding to correspond to the frequency of operation and orthogonal coding of the transmitter located in the base station 104 in which the ground-based mobile subscriber station 101 is presently operational.

Base Stations and Control Channels

Mobile cellular telecommunication systems provide a plurality of concurrently active communications in the same service area, with the number of concurrently active communication connections exceeding the number of available radio channels. This is accomplished by reusing the channels via the provision of multiple base stations 102, 104 in the service area that is served by a single mobile switching center 103. The overall service area of a mobile switching center 103 is divided into a plurality of "cells", each of which includes a base station 102 and associated radio transmission tower. The radius of the cell is basically the distance from the base station tower to the furthest locus at which good reception between the mobile subscriber station 101 and the base station 102 can be effected. The entire service area of a mobile switching center 103 is therefore covered by a plurality of adjacent cells. There is an industry standard cell pattern in which sets of channels are reused. Within a particular cell, the surrounding cells are grouped in a circle around the first cell and the channels used in these surrounding cells differ from the channels used in the particular cell and from each of the other surrounding cells. Thus, the signals emanating from the radio transmission tower in the particular cell do not interfere with the signals emanating from the radio transmission towers located in each of the surrounding cells because they are at different frequencies and have different orthogonal coding. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern is simply conceptual in nature and does not reflect the actual physical extent on the various cells, since the implemented cells are not hexagonal in configuration and do not have precisely delimited boundary edges.

The control channels that are available in this system are used to setup the communication connections between the mobile subscriber stations 101 and the base station 102. When a call is initiated, the control channel is used to communicate between the mobile subscriber station 101 involved in the call and the local serving base station 102. The control messages locate and identify the mobile subscriber station 101, determine the dialed number and the associated feature code, and identify an available voice/data communication channel consisting of a pair of radio frequencies and orthogonal coding which is selected by the base station 102 for the communication connection. The radio unit in the mobile subscriber station 101 retunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber station 101 to an adjacent cell, when the subscriber moves from the present cell to one of the adjoining cells. The transmitter power of the mobile subscriber station 101 is regulated since the magnitude of the signal received at the base station 102 is a function of the mobile subscriber station transmitter power and the distance from the base station 102. Therefore, by scaling the transmitter power to correspond to the distance from the base station 102, the received signal magnitude can be maintained within a predetermined range of values to ensure accurate signal reception without interfering with other transmissions in the cell.

In this system, the system for providing prioritized wireless communication service to wireless communication subscribers 100 in part comprises software resident at the cell site 110A which receives the identity of the mobile subscriber station 101 from the base station 102 at step 208 pursuant to the wireless service request process noted above. At step 209, the cell site resident software of the system for providing prioritized wireless communication service to wireless communication subscribers 100 extends the call connection to the mobile switching center 103 and forwards the dialed number received from the mobile subscriber station 101 to the mobile switching center 103 for analysis. If the dialed digits include a priority service code, comprising for example the feature code *XX, which identifies the request for priority service from the mobile subscriber station 101, the identity of the mobile subscriber station 101 and the dialed priority service code are compared with the service priority data stored in the Home Location Register 113 associated with this mobile subscriber station 101 to determine whether this mobile subscriber station 101 is entitled to priority wireless service. The comparison process can optionally determine at step 210 whether the wireless communication capacity allocated for use by the members of this service priority group can support a wireless communication connection for the mobile subscriber station 101. If these determinations indicate that the mobile subscriber station 101 should be denied service, call processing exits at step 211 where the mobile subscriber station 101 is provided with a brief "no service available" message. If service can be provided to the mobile subscriber station 101, call processing advances to step 212 where the communication connection is extended from this transmitter-receiver pair of the base station 102 to another communications network, such as a common carrier public telephones network to complete the service request received from the mobile subscriber station 101 or the call is queued for service. This second stage of the communication connection is set up in well known fashion in the mobile switching center 103, which is connected to the common carrier public telephone network by incoming and outgoing trunks. The mobile switching center 103 contains a switching network to switch mobile customer voice and/or data signals from the communication link to an incoming or outgoing trunk. The mobile telecommunication system is controlled by a mobile telecommunication controller 114 at the mobile switching center 103 and a base station controller (not shown) at or remotely connected to each base station 102, 104 associated with the mobile switching center 103. A plurality of data links connect the mobile telecommunication controller 114 and the associated base station controllers. The mobile telecommunication controller 114 operates under control of complex software and controls the switching network. The mobile telecommunication controller 114 also controls the actions of the associated base station controllers by generating and interpreting the control messages that are exchanged with the associated base station controllers over the data links. The base station controllers at each base station 102, 104, in response to control messages from the mobile telecommunication controller 114, control the transmitter-receiver pairs at the base station 102, 104. The control processes at each base station 102, 104 also control the tuning of the mobile subscriber stations 101 to the selected radio frequencies.

Call Handoff

When a mobile subscriber station 101 approaches the boundary of a cell, the radio signal received at the base station 102 is at a minimum level. Since the mobile subscriber station 101 is at the boundary of two cells, the signal power from the transmitter located in the adjacent cell is equal to or greater than the original cell and a handoff procedure is initiated. First, the cell base station 102 may initiate a mobile subscriber station location process in the adjoining cells. Alternatively, in a CDMA system, the serving base station 102 may utilize measurements from the mobile subscriber station 101 by processing the received pilot strength measurement message. This first procedure is accomplished in a TDMA system either by activation or continuous operation of a locating receiver in each of the adjoining cells which tunes to the radio frequency and channel on which the mobile subscriber station 101 is transmitting. The measured signal strength of this signal, as received at each of the adjoining cells, is compared and the strongest signal is indicative at that base station 104 which is to receive the handoff. If there is an available voice channel in that cell, the mobile subscriber station 101 is sent a message on the control channel to re-tune its transmitter to the identified available voice channel at the transmitter frequency and orthogonal coding of the selected cell. Simultaneously, the voice connection is switched at the base stations 102, 104 from one cell to the next via the Mobile Switching Center 103 to provide uninterrupted service. In this handoff process, the availability of wireless communication services is determined by the system for providing prioritized wireless communication service to wireless communication subscribers 100, using the above-defined service availability process of steps 208–212.

Alternative Service Features

It is evident that there are numerous alternative embodiments of the present system for providing prioritized wireless communication service to wireless communication subscribers that are possible. One such alternative entails a review of the destination defined in the mobile subscriber station call origination. Thus, calls initiated by a mobile subscriber station to an emergency service agency would be processed, by providing a dynamically assigned temporary service priority to the mobile subscriber station that initiates such a call so that contact with the emergency service agencies is not denied to the mobile subscriber stations.

Summary

The system for providing prioritized wireless communication service to wireless communication subscribers provides the capability to restrict access to wireless communications services to a selected set of subscribers, such that their access to wireless communication services is not interruptible. The wireless subscribers who have been assigned a predetermined service priority are provided with access to reserved wireless communication capacity in the wireless communication system via the dialing of a predetermined feature code to ensure their uninterrupted access to wireless communication services.

What is claimed:

1. A system for providing wireless communication service on a preferential basis to predefined ones of wireless subscribers from the wireless subscribers requesting wireless communication service in a wireless communication system which comprises a mobile switching center that controls the operation of a plurality of cell sites, comprising:

memory means for storing data indicative of a plurality of wireless subscriber service priorities, each of said plurality of wireless subscriber service priorities defining a level of preferential access to wireless services from said mobile switching center, and the identity of wireless subscribers who are assigned these service priorities;

means, responsive to receipt of service requests from said wireless subscribers in excess of capacity of said mobile switching center to serve said received service requests, for selecting at least one of said plurality of wireless subscriber service priorities to provide preferential access to wireless communication facilities by wireless subscribers who have an assigned wireless subscriber service priority corresponding to said selected at least one of said plurality of wireless subscriber service priorities; and means, responsive to receipt of data from a call originating one of said wireless subscribers indicative of a service request, for comparing said received data with said selected at least one of said plurality of wireless subscriber service priorities.

2. The system of claim 1 further comprising:

means for rejecting a call initiation service request received from a wireless subscriber whose assigned wireless subscriber service priority fails to match one of said selected at least one of said plurality of wireless subscriber service priorities; and means for serving a call initiation service request received from a wireless subscriber whose assigned wireless subscriber service priority matches one of said selected at least one of said plurality of wireless subscriber service priorities.

3. The system of claim 2 wherein said means for comparing is operational in said mobile switching center, said means for serving comprises:

means, operable in said cell site, for extending a call connection from said wireless subscriber to said mobile switching center through said cell site;

means for transmitting said received data and data indicative of an identity of said wireless subscriber to said mobile switching center; and means, operable in said mobile switching center, for comparing said received data and said data indicative of an identity of said wireless subscriber with said data, stored in said memory means, indicative of a plurality of wireless subscriber service priorities and the identity of wireless subscribers who are assigned these wireless subscriber service priorities.

4. The system of claim 3 wherein said means for serving further comprises:

means, responsive to a match of said received data and said data indicative of an identity of said wireless subscriber with said data, stored in said memory;

means, indicative of a plurality of wireless subscriber service priorities and the identity of wireless subscribers who are assigned these wireless subscriber service priorities, for serving said call initiation service request received from said wireless subscriber.

5. The system of claim 1 further comprising:

means for storing data indicative of wireless call capacity allocated for wireless subscribers in each of said plurality of wireless subscriber service priorities.

6. The system of claim 5 wherein said means for selecting comprises:

means for determining a wireless subscriber service priority assigned to a wireless subscriber who generates a call initiation service request;

means for determining availability of wireless call capacity reserved, as defined by data stored in said means for storing data indicative of wireless call capacity, for wireless subscribers assigned said wireless subscriber service priority; and means, responsive to a determined availability of said wireless call capacity reserved for wireless subscribers assigned said wireless subscriber service priority, for serving said call initiation service request received from said wireless subscriber.

7. The system of claim 5 wherein said means for selecting further comprises:

means for determining a service priority assigned to a wireless subscriber who generates a call handoff service request;

means for determining availability of wireless call capacity reserved, as defined by data stored in said means for storing data indicative of wireless call capacity, for wireless subscribers assigned said wireless subscriber service priority; and means, responsive to a determined availability of said wireless call capacity reserved for wireless subscribers assigned said wireless subscriber service priority, for serving said call handoff service request received from said wireless subscriber.

8. The system of claim 1 wherein said means for selecting comprises:

means for rejecting a call handoff service request received from a wireless subscriber whose assigned wireless subscriber service priority fails to match one of said selected at least one of said plurality of wireless subscriber service priorities.

9. The system of claim 1 wherein said means for selecting comprises:

means for serving a call handoff service request received from a wireless subscriber whose assigned wireless subscriber service priority matches one of said selected at least one of said plurality of wireless subscriber service priorities.

10. The system of claim 1 wherein said means for comparing comprises:

means, responsive to said wireless subscriber dialing a feature code indicative of a service request, for comparing said received feature code data with said selected at least one of said plurality of wireless subscriber service priorities.

11. A method of providing wireless communication service on a preferential basis to predefined ones of wireless subscribers from the wireless subscribers requesting wireless communication service in a wireless communication system which comprises a mobile switching center that controls the operation of a plurality of cell sites, comprising the steps of:

storing in a memory data indicative of a plurality of wireless subscriber service priorities, each of said plurality of wireless subscriber service priorities defining a level of preferential access to wireless services from said mobile switching center, and the identity of wireless subscribers who are assigned these wireless subscriber service priorities;

selecting, in response to receipt of service requests from said wireless subscribers in excess of capacity of said mobile switching center to serve said received service requests, at least one of said plurality of wireless subscriber service priorities to provide preferential access to wireless communication facilities by wireless subscribers who have an assigned wireless subscriber service priority corresponding to said selected at least one of said plurality of wireless subscriber service priorities; and comparing, in response to receipt of data from a call originating one of said wireless subscribers indicative of a service request, said received data with said selected at least one of said plurality of wireless subscriber service priorities.

12. The method of claim 11 further comprising the steps of:

rejecting a call initiation service request received from a wireless subscriber whose assigned service priority fails to match one of said selected at least one of said plurality of wireless subscriber service priorities; and serving a call initiation service request received from a wireless subscriber whose assigned service priority matches one of said selected at least one of said plurality of wireless subscriber service priorities.

13. The method of claim 12 wherein said step of comparing is executed in said mobile switching center, said step of serving comprises:

extending in said cell site a call connection from said wireless subscriber to said mobile switching center through said cell site;

transmitting said received data and data indicative of an identity of said wireless subscriber to said mobile switching center; and comparing in said mobile switching center said received data and said data indicative of an identity of said wireless subscriber with said data, stored in said memory, indicative of a plurality of wireless subscriber service priorities and the identity of wireless subscribers who are assigned these wireless subscriber service priorities.

14. The method of claim 13 wherein said step of serving further comprises:

serving, in response to a match of said received data and said data indicative of an identity of said wireless subscriber with said data, stored in said memory, indicative of a plurality of wireless subscriber service priorities and the identity of wireless subscribers who are assigned these wireless subscriber service priorities, said call initiation service request received from said wireless subscriber.

15. The method of claim 11 further comprising the step of:

storing data in a memory indicative of wireless call capacity allocated for wireless subscribers in each of said plurality of wireless subscriber service priorities.

16. The method of claim 15 wherein said step of selecting comprises:

determining a wireless subscriber service priority assigned to a wireless subscriber who generates a call initiation service request;

determining availability of wireless call capacity reserved, as defined by data stored in said memory indicative of wireless call capacity, for wireless subscribers assigned said wireless subscriber service priority; and serving, in response to a determined availability of said wireless call capacity reserved for wireless subscribers assigned said wireless subscriber service priority, said call initiation service request received from said wireless subscriber.

17. The method of claim 15 wherein said step of selecting further comprises:

determining a wireless subscriber service priority assigned to a wireless subscriber who generates a call handoff service request;

determining availability of wireless call capacity reserved, as defined by data stored in said memory indicative of wireless call capacity, for wireless subscribers assigned said wireless subscriber service priority; and serving, in response to a determined availability of said wireless call capacity reserved for wireless subscribers assigned said wireless subscriber service priority, said call handoff service request received from said wireless subscriber.

18. The method of claim 11 wherein said step of selecting comprises:

rejecting a call handoff service request received from a wireless subscriber whose assigned wireless subscriber service priority fails to match one of said selected at least one of said plurality of wireless subscriber service priorities.

19. The method of claim 11 wherein said step of selecting comprises:

serving a call handoff service request received from a wireless subscriber whose assigned wireless subscriber service priority matches one of said selected at least one of said plurality of wireless subscriber service priorities.

20. The method of claim 11 wherein said step of comparing comprises:

comparing, in response to said wireless subscriber dialing a feature code indicative of a service request, said received feature code data with said selected at least one of said plurality of wireless subscriber service priorities.

21. A system for providing prioritized wireless communication service on a preferential basis to predefined ones of wireless subscribers from the wireless subscribers requesting wireless communication service in a wireless communication system which comprises a mobile switching center that controls the operation of a plurality of cell sites, comprising:

memory means for storing data indicative of a plurality of wireless subscriber service priorities, each of said plurality Of wireless subscriber service priorities defining a level of preferential access to wireless services from said mobile switching center, and the identity of wireless subscribers who are assigned these wireless subscriber service priorities;

means, responsive to receipt of service requests from said wireless subscribers in excess of capacity of said mobile switching center to serve said received service requests, for selecting at least one of said plurality of wireless subscriber service priorities to provide preferential access to wireless communication facilities in each of said plurality of cell sites by wireless subscribers who have an assigned wireless subscriber service priority corresponding to said selected at least one of said plurality of wireless subscriber service priorities;

means, responsive to receipt of feature code dialed data from a call originating one of said wireless subscribers at a one of said cell sites indicative of a wireless subscriber service priority, for comparing in said mobile switching center said received feature code data with said selected at least one of said plurality of wireless subscriber service priorities;

means for rejecting at said mobile switching center a call initiation service request received from a wireless subscriber whose assigned wireless subscriber service priority fails to match one of said selected at least one of said plurality of wireless subscriber service priorities; and means for serving at said mobile switching center a call initiation service request received from a wireless subscriber whose assigned wireless subscriber service priority matches one of said selected at least one of said plurality of wireless subscriber service priorities.

22. The system of claim 21 wherein said means for comparing is operational in said mobile switching center, said means for serving comprises:

means, operable in said cell site, for extending a call connection from said wireless subscriber to said mobile switching center through said cell site;

means for transmitting said received data and data indicative of an identity of said wireless subscriber to said mobile switching center; and means, operable in said mobile switching center, for comparing said received data and said data indicative of an identity of said wireless subscriber with said data, stored in said memory means, indicative of a plurality of wireless subscriber service priorities and the identity of wireless subscribers who are assigned these wireless subscriber service priorities.

23. The system of claim 22 wherein said means for serving further comprises:

means, responsive to a match of said received data and said data indicative of an identity of said wireless subscriber with said data, stored in said memory means, indicative of a plurality of wireless subscriber service priorities and the identity of wireless subscribers who are assigned these wireless subscriber service priorities, for serving said call initiation service request received from said wireless subscriber.

* * * * *